United States Patent
Misu et al.

(10) Patent No.: US 12,033,340 B2
(45) Date of Patent: Jul. 9, 2024

(54) SYSTEM, INFORMATION PROCESSING APPARATUS, VEHICLE, AND METHOD

(71) Applicant: HONDA MOTOR CO., LTD., Tokyo (JP)

(72) Inventors: Teruhisa Misu, San Jose, CA (US); Naoki Hosomi, Wako (JP); Kentaro Yamada, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 310 days.

(21) Appl. No.: 17/703,947

(22) Filed: Mar. 24, 2022

(65) Prior Publication Data

US 2023/0326048 A1 Oct. 12, 2023

(51) Int. Cl.
*G06K 9/00* (2022.01)
*B60W 60/00* (2020.01)
(Continued)

(52) U.S. Cl.
CPC ......... *G06T 7/50* (2017.01); *B60W 60/00253* (2020.02); *G06V 20/50* (2022.01);
(Continued)

(58) Field of Classification Search
CPC .......... G06T 7/50; G06V 20/50; G06V 20/63; G06V 30/10
See application file for complete search history.

(56) References Cited

U.S. PATENT DOCUMENTS 9,547,644 B2 * 1/2017 Cuthbert ................ G06V 20/63
10,522,145 B2 12/2019 Ogawa
(Continued)

FOREIGN PATENT DOCUMENTS

DE 10241975 A1 * 4/2003 ........... G06K 9/2054
EP 3144823 A1 * 3/2017 ........... G06F 17/289
(Continued)

OTHER PUBLICATIONS

RoadText-1K: Text Detection & Recognition Dataset for Driving Videos, Sangeeth Reddy et al., IEEE, 2020, pp. 11074-11080 (Year: 2020).*
Teleoperation of Highly Automated Vehicles in Public Transport: User-Centered Design of a Human-Machine Interface for Remote-Operation and Its Expert Usability Evaluation, Carmen Kettwich et al., MDPI, 2021, pp. 1-22. (Year: 2021).*

*Primary Examiner* — Jayesh A Patel
(74) *Attorney, Agent, or Firm* — Thomas| Horstemeyer, LLP

(57) ABSTRACT

A system including an acquisition unit configured to acquire, from a user via a communication device associated with the user, target object data including a feature of a target object selected by the user, an analysis unit configured to analyze whether the target object data that has been acquired by the acquisition unit includes, as the feature, at least one of data of a proper noun or data of a character string related to the target object, and whether the target object data includes data of a color related to the target object, and an estimation unit configured to estimate a distance from the target object to the user, based on an analysis result of the analysis unit, wherein the estimation unit estimates the distance from the target object to the user such that the distance from the target object to the user in a case where the target object data includes at least one of the data of the proper noun or the data of the character string is shorter than the distance from the target object to the user in a case where the target object data includes the data of the color is provided.

13 Claims, 6 Drawing Sheets

(51) Int. Cl.
   *G06T 7/50*   (2017.01)
   *G06V 20/50*   (2022.01)
   *G06V 20/62*   (2022.01)
   *G06V 30/10*   (2022.01)

(52) U.S. Cl.
   CPC .............. *G06V 20/63* (2022.01); *G06V 30/10* (2022.01); *B60W 2554/802* (2020.02); *B60W 2556/45* (2020.02)

(56) References Cited

U.S. PATENT DOCUMENTS

| | | | |
|---|---|---|---|
| 11,119,722 B2 | 9/2021 | Tanaka | |
| 2010/0292917 A1* | 11/2010 | Emam | A61H 3/061 |
| | | | 701/533 |
| 2011/0222775 A1* | 9/2011 | Aizawa | G06V 20/635 |
| | | | 382/190 |
| 2013/0266175 A1* | 10/2013 | Zhang | G06V 10/457 |
| | | | 382/103 |
| 2015/0134318 A1* | 5/2015 | Cuthbert | G06F 40/58 |
| | | | 715/231 |
| 2015/0226570 A1* | 8/2015 | Takei | G09B 29/10 |
| | | | 701/454 |
| 2018/0225524 A1* | 8/2018 | Fujita | G06V 20/56 |
| 2019/0057696 A1* | 2/2019 | Ogawa | A61B 1/0627 |
| 2019/0272143 A1* | 9/2019 | Tanaka | B25J 13/08 |
| 2019/0392231 A1* | 12/2019 | Dean | G06V 30/153 |
| 2020/0158513 A1* | 5/2020 | Suzuki | G01C 21/26 |
| 2020/0192398 A1* | 6/2020 | Xu | G06V 20/582 |
| 2020/0356794 A1* | 11/2020 | Dean | G06N 3/08 |
| 2021/0192238 A1* | 6/2021 | Dean | G06V 30/19147 |
| 2021/0334995 A1* | 10/2021 | Spence | G06T 7/12 |
| 2022/0089127 A1* | 3/2022 | Hanaoka | G06Q 30/0645 |
| 2022/0188554 A1* | 6/2022 | Huang | G01S 13/931 |
| 2022/0405579 A1* | 12/2022 | Yu | G06N 3/084 |
| 2023/0030837 A1* | 2/2023 | Dong | G06V 40/103 |
| 2023/0075493 A1* | 3/2023 | Kabkab | G06V 20/582 |
| 2023/0154127 A1* | 5/2023 | Martin-Bragado | G06T 15/20 |
| | | | 345/419 |
| 2023/0298340 A1* | 9/2023 | Hosomi | G06V 10/776 |
| | | | 382/103 |

FOREIGN PATENT DOCUMENTS

| | | | | |
|---|---|---|---|---|
| JP | 2017-156511 A | | 9/2017 | |
| JP | 2017156511 A | * | 9/2017 | ......... A61B 1/00039 |
| JP | 2020160847 A | * | 10/2020 | |
| WO | 2018/087971 A1 | | 5/2018 | |
| WO | WO-2018087971 A1 | * | 5/2018 | .......... B25J 11/0005 |
| WO | WO-2019083275 A1 | * | 5/2019 | .......... G06F 16/532 |

* cited by examiner

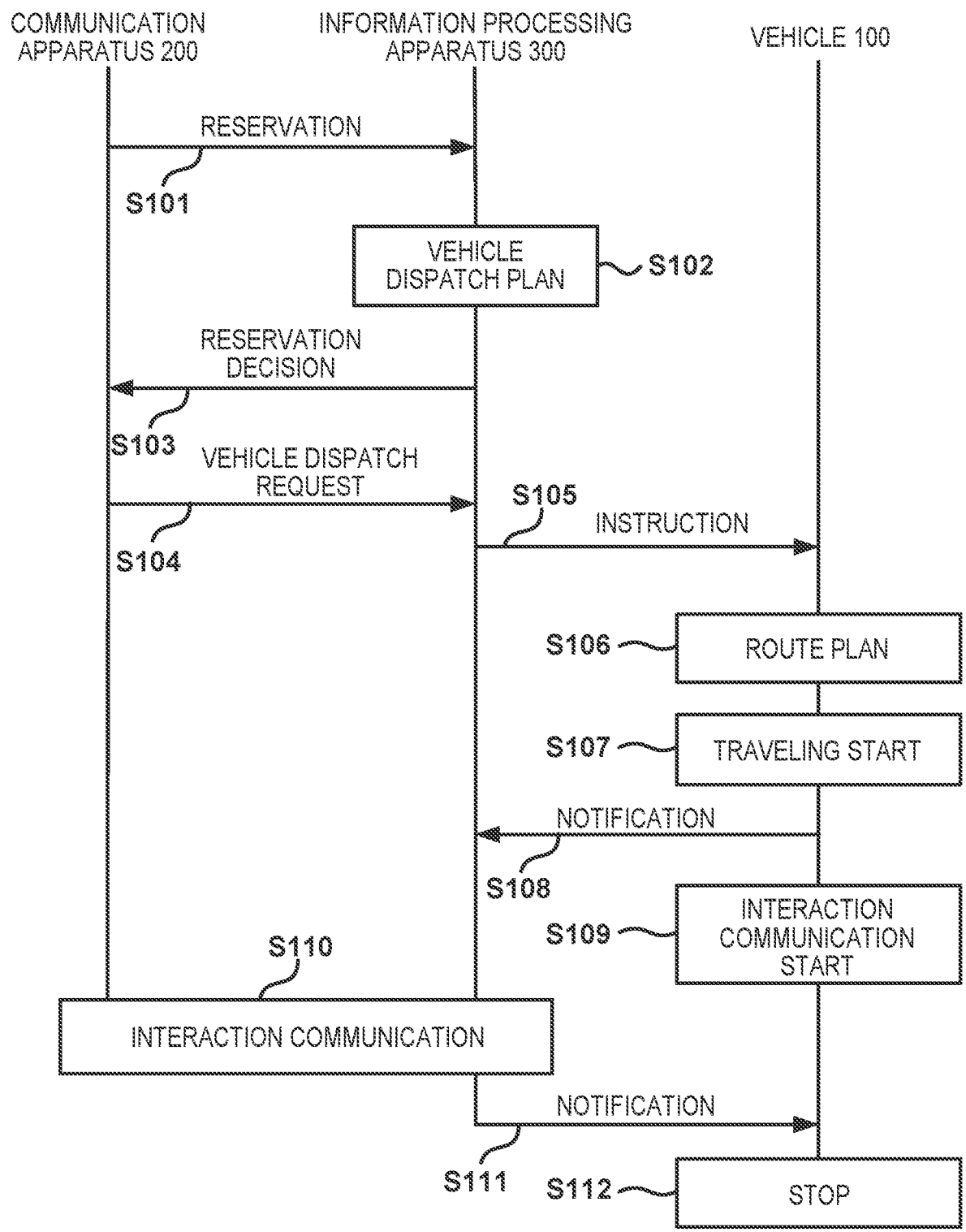

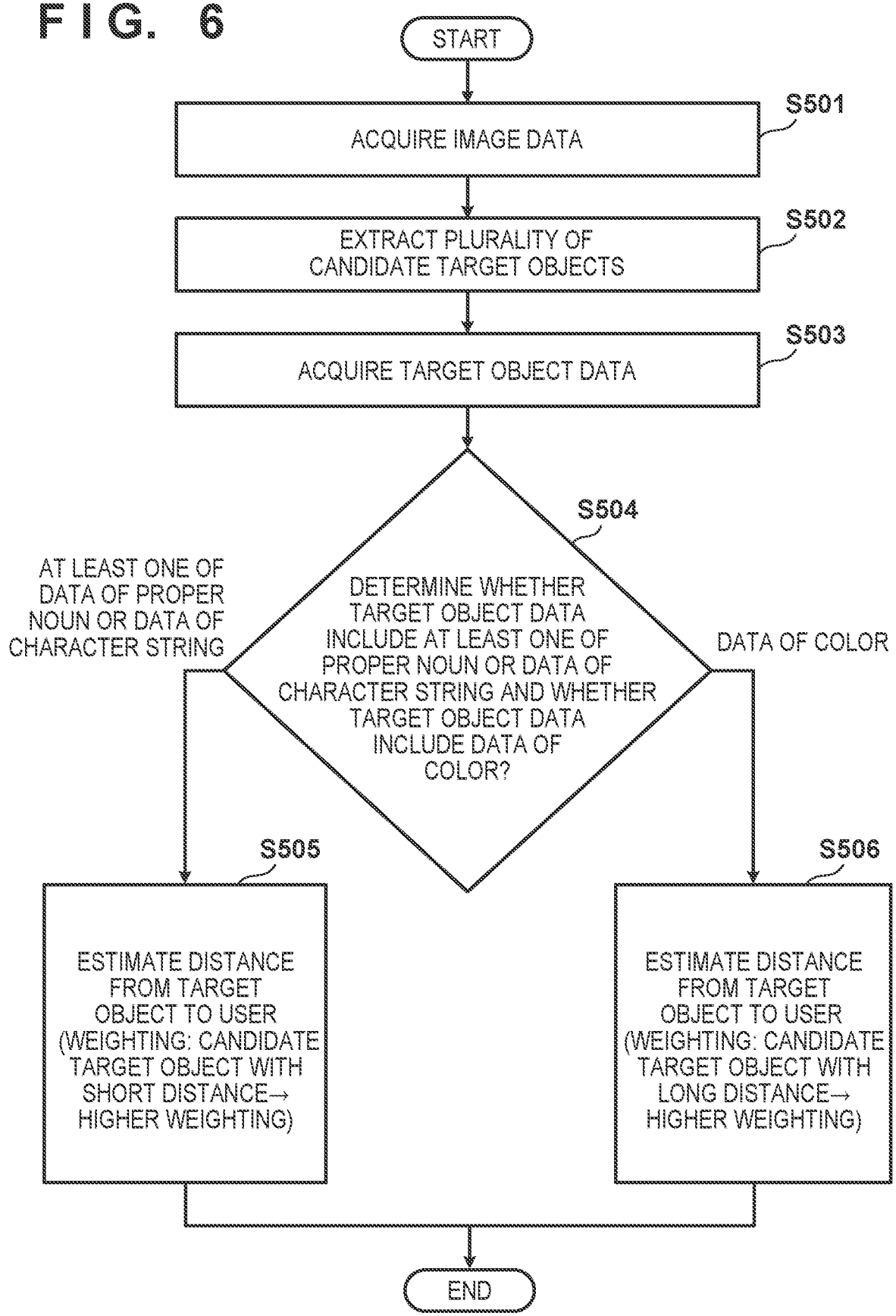

SYSTEM, INFORMATION PROCESSING APPARATUS, VEHICLE, AND METHOD

BACKGROUND OF THE INVENTION

Field of the Invention

The present invention relates a system, an information processing apparatus, a vehicle, and a method.

Description of the Related Art

In recent years, while advancements in research and development of vehicles (automated driving vehicles) each having an automated driving functionality that automatically and autonomously travels without the need for a driving operation by a driver have been progressing, for example, a vehicle in which one to two persons can get, so-called ultra-small mobility (micro mobility) is attracting attention as a convenient transportation means in a region for elderly people, tourists, and the like. In addition, in utilizing such ultra-small mobility, it can be considered to combine with a vehicle dispatch service, with which it is possible to request the ultra-small mobility via a communication apparatus or the like owned by a user, when the user desires to use the service.

In order to combine the ultra-small mobility and the vehicle dispatch service, a technique for dispatching (moving) the ultra-small mobility to a place of a user in response to a use request from the user is needed. In relation to such a technique, WO 2018/087971 A proposes a technique for estimating a scene (place) where a portable apparatus (mobile apparatus) owned by a user is located, and Japanese Patent Laid-Open No. 2017-156511 proposes a technique for controlling a vehicle by voice.

On the other hand, when the ultra-small mobility is dispatched and approaches the place of the user, it is necessary to grasp the distance to the user in a relatively accurate manner in order to have the user get in the vehicle.

Even when the user make an utterance to the ultra-small mobility approaching the place of the user, however, it is a rare case that the distance to the target place (for example, "20 meters ahead" or the like) is designated (provided) explicitly. Hence, there is a demand for developments in the technique for estimating (acquiring) the distance between the user and, for example, a target object (landmark) such as a utility pole included in a content of an utterance made by the user, as information regarding the distance to the user from the content of the utterance.

SUMMARY OF THE INVENTION

The present invention provides a new technique for estimating a distance from a target object selected by a user to the user.

According to one aspect of the present invention, there is provided a system including an acquisition unit configured to acquire, from a user via a communication device associated with the user, target object data including a feature of a target object selected by the user, an analysis unit configured to analyze whether the target object data that has been acquired by the acquisition unit includes, as the feature, at least one of data of a proper noun or data of a character string related to the target object, and whether the target object data includes data of a color related to the target object, and an estimation unit configured to estimate a distance from the target object to the user, based on an analysis result of the analysis unit, wherein the estimation unit estimates the distance from the target object to the user such that the distance from the target object to the user in a case where the target object data includes at least one of the data of the proper noun or the data of the character string is shorter than the distance from the target object to the user in a case where the target object data includes the data of the color.

According to another aspect of the present invention, there is provided an information processing apparatus including an acquisition unit configured to acquire, from a user via a communication device associated with the user, target object data including a feature of a target object selected by the user, an analysis unit configured to analyze whether the target object data that has been acquired by the acquisition unit includes, as the feature, at least one of data of a proper noun or data of a character string related to the target object, and whether the target object data includes data of a color related to the target object, and an estimation unit configured to estimate a distance from the target object to the user, based on an analysis result of the analysis unit, wherein the estimation unit estimates the distance from the target object to the user such that the distance from the target object to the user in a case where the target object data includes at least one of the data of the proper noun or the data of the character string is shorter than the distance from the target object to the user in a case where the target object data includes the data of the color.

According to further another aspect of the present invention, there is provided a vehicle that automatically and autonomously travels to a place of a user, the vehicle including an acquisition unit configured to acquire, from the user via a communication device associated with the user, target object data including a feature of a target object selected by the user, an analysis unit configured to analyze whether the target object data that has been acquired by the acquisition unit includes, as the feature, at least one of data of a proper noun or data of a character string related to the target object, and whether the target object data includes data of a color related to the target object, and an estimation unit configured to estimate a distance from the target object to the user, based on an analysis result of the analysis unit, wherein the estimation unit estimates the distance from the target object to the user such that the distance from the target object to the user in a case where the target object data includes at least one of the data of the proper noun or the data of the character string is shorter than the distance from the target object to the user in a case where the target object data includes the data of the color.

According to further another aspect of the present invention, there is provided a method including acquiring, from a user via a communication device associated with the user, target object data including a feature of a target object selected by the user, analyzing whether the target object data that has been acquired in the acquiring includes, as the feature, at least one of data of a proper noun or data of a character string related to the target object, and whether the target object data includes data of a color related to the target object, and estimating a distance from the target object to the user, based on an analysis result of the analyzing, wherein the estimating estimates the distance from the target object to the user such that the distance from the target object to the user in a case where the target object data includes at least one of the data of the proper noun or the data of the character string is shorter than the distance from the target object to the user in a case where the target object data includes the data of the color.

Further aspects of the present invention will become apparent from the following description of exemplary embodiments with reference to the attached drawings.

BRIEF DESCRIPTION OF THE DRAWINGS

FIG. 2 is a diagram for describing an example of a flow of a vehicle dispatch service in the control system.

FIG. 6 is a flowchart for describing a process example of interaction communication (S110) in the information processing apparatus.

DESCRIPTION OF THE EMBODIMENTS

Figure 1A:
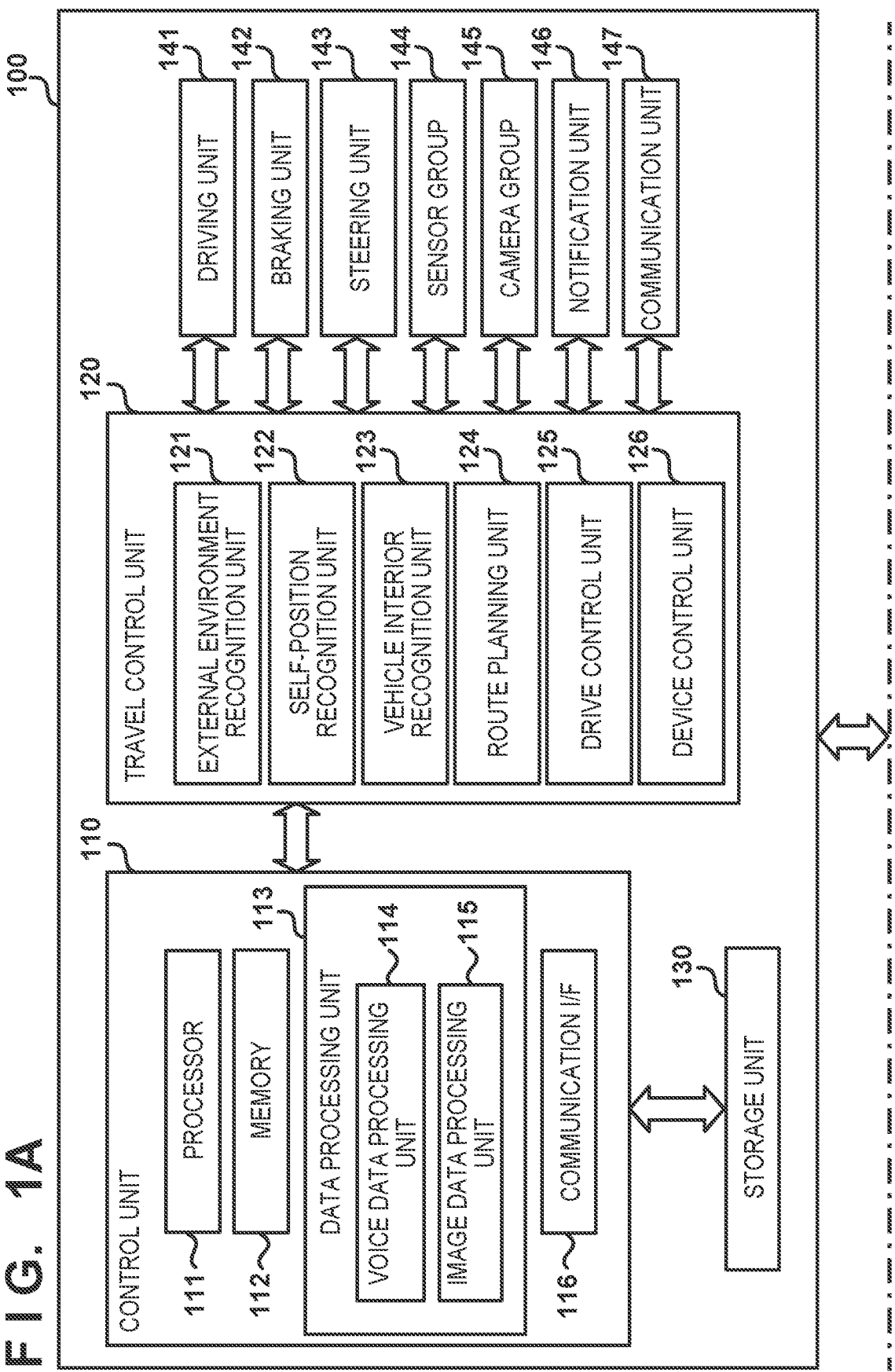
FIG. 1A is a schematic diagram illustrating a configuration of a control system as one aspect of the present invention.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

Figure 1B:
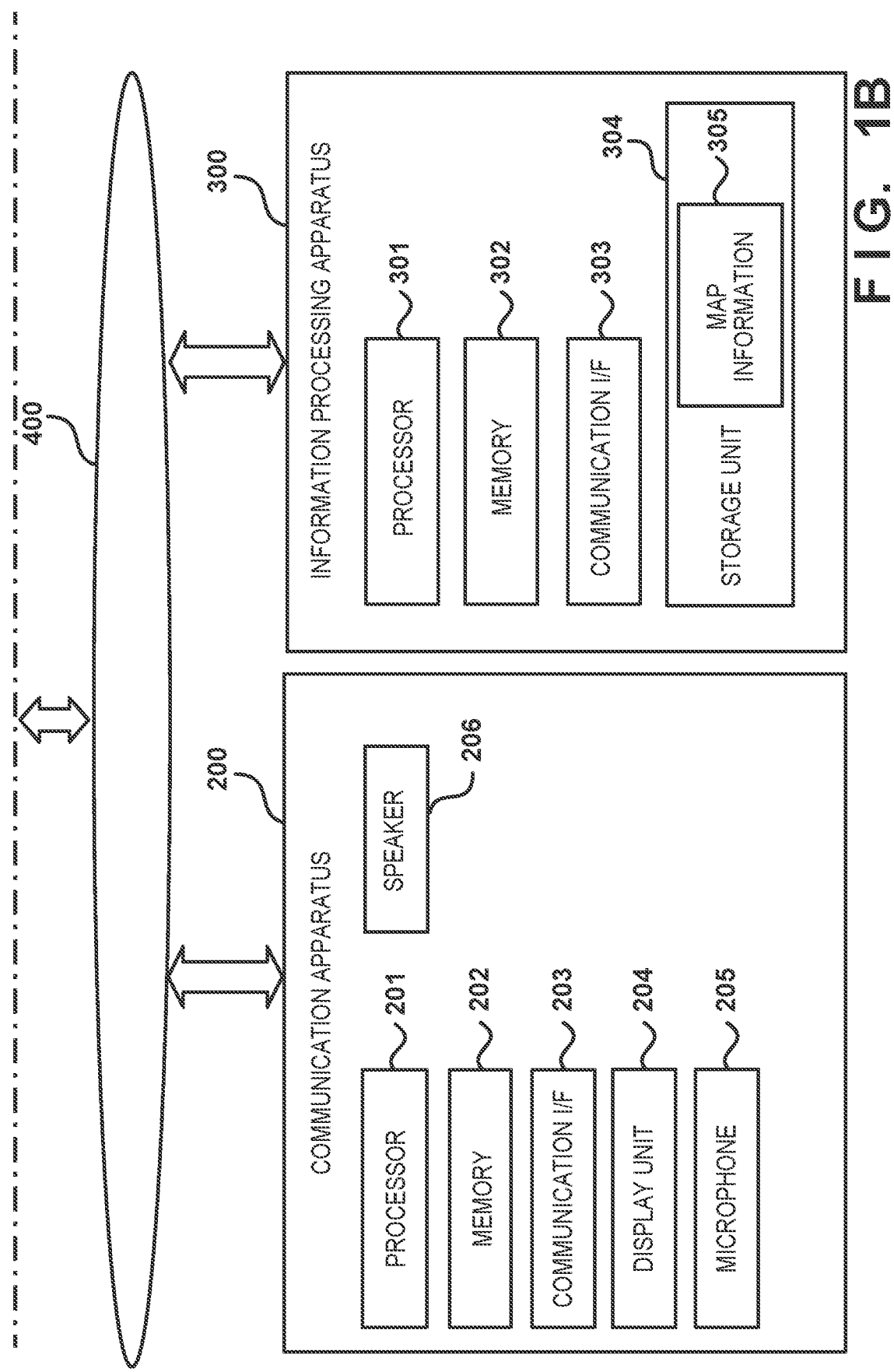
FIG. 1B is a schematic diagram illustrating a configuration of a control system as one aspect of the present invention.

FIG. 1A and FIG. 1B are a schematic diagrams illustrating a configuration of a control system 1 as one aspect of the present invention. As illustrated in FIG. 1A and FIG. 1B, the control system 1 includes a vehicle 100, a communication apparatus 200 owned by a user, and an information processing apparatus 300 that manages the vehicle 100, and controls a vehicle dispatch service to be offered by using the vehicle 100. Here, the vehicle dispatch service is a service for dispatching the vehicle 100 to a place of a user. When using the vehicle dispatch service offered from the control system 1, the user installs an application that enables the user to receive the vehicle dispatch service into the communication apparatus 200 from the information processing apparatus 300, and registers information (user information) regarding the user in the information processing apparatus 300 via the application. The information processing apparatus 300 manages identification information by which each user is identifiable, for example, a user name and an e-mail address as the user information that has been registered by the user.

When the user information is registered in the information processing apparatus 300, the user is able to request (ask) a vehicle dispatch of the vehicle 100 via the communication apparatus 200 (application) while in a city area, for example. The vehicle 100 is a vehicle (automated driving vehicle) having an automated driving functionality of automatically and autonomously traveling, and in the present embodiment, is embodied as a vehicle in which one or two persons are able to get, that is, an ultra-compact mobility vehicle. The user is able to receive the vehicle dispatch service by getting in the vehicle 100 that has been dispatched to the place of the user. In addition, a use fee (billing) for the vehicle dispatch service is charged at a given timing, for example, a timing when the user gets in the vehicle 100 or a timing when the user gets off the vehicle 100.

First, the configuration of the vehicle 100 will be specifically described. The vehicle 100 includes a control unit 110, a travel control unit 120, an external environment recognition unit 121, a self-position recognition unit 122, a vehicle interior recognition unit 123, a route planning unit 124, a drive control unit 125, a device control unit 126, a storage unit 130, a driving unit 141, a braking unit 142, a steering unit 143, a sensor group 144, a camera group 145, a notification unit 146, and a communication unit 147. Note that the respective functions (blocks) to be described below may be integrated together or separated from each other, and a function to be described may be implemented by another block. In addition, a function to be described as hardware may be implemented by software, and vice versa.

The travel control unit 120 includes, for example, a plurality of EUCs and integrally controls traveling of the vehicle 100. Note that, in the present embodiment, it is assumed that the traveling of the vehicle 100 includes traveling by automated driving that does not need a driving operation by the driver (user). However, the traveling by the driving operation by the user is not excluded after the user gets in the vehicle 100.

The external environment recognition unit 121 includes an external environment recognition camera and an external environment recognition sensor, recognizes an external environment (surrounding) situation of the vehicle 100, and acquires external environment information indicating the external environment situation. The external environment recognition camera is included in the camera group 145, and includes a camera that images the surroundings of the vehicle 100 to acquire image data. In addition, the external environment recognition sensor is included in the sensor group 144, and includes a sensor that has a function of detecting a target object (object) in the surroundings of the vehicle 100 and measuring a distance to the target object, so-called light detection and ranging (LIDAR). The external environment recognition unit 121 recognizes, for example, an intersection, a railroad crossing, and a tunnel, free spaces such as road shoulders, and behaviors (speeds and traveling directions) of other vehicles, based on signals from the external environment recognition camera and the external environment recognition sensor.

The self-position recognition unit 122 recognizes (identifies) the current position of the vehicle 100 based on the signal from the GPS (Global Positioning System) sensor included in the sensor group 144.

The vehicle interior recognition unit 123 includes a vehicle interior recognition camera and a vehicle interior recognition sensor, and recognizes (identifies) a situation inside the vehicle 100, specifically, the user (passenger) in the vehicle 100 or a state of the user in the vehicle 100. The vehicle interior recognition camera is included in the camera group 145, and includes, for example, a near-infrared camera provided on a display device included in the notification unit 146. For example, the vehicle interior recognition unit 123 recognizes the direction of the line of sight of the user from the image that has been acquired by the vehicle interior recognition camera. In addition, the vehicle interior recognition sensor is included in the sensor group 144, and includes, for example, a sensor for detecting a biological signal of a user in the vehicle 100 and acquiring biological information.

The route planning unit 124 plans a route (action) on which the vehicle 100 should travel, such as an optimal route to a destination set by the user or a risk avoidance route based on the external environment information that has been acquired by the external environment recognition unit 121 or the current position of the vehicle 100 that has been recognized by the self-position recognition unit 122. In addition, the route planning unit 124 also makes an action plan, for example, in accordance with an entry determination based on a start point or an end point of an intersection, a railroad crossing, or the like, or in accordance with (predictions of) behaviors of other vehicles.

The drive control unit 125 controls the driving unit 141, the braking unit 142, and the steering unit 143 so that the vehicle 100 travels in accordance with the route that has been planned by the route planning unit 124. The braking unit 142 corresponds to a brake device that applies brakes on the vehicle 100. The steering unit 143 corresponds to a device including a mechanism for steering the wheels of the vehicle 100. The steering unit 143 includes, for example, a motor that outputs driving force for automatically steering the wheels, a sensor that detects a steering angle, and the like.

The device control unit 126 controls devices connected with the travel control unit 120. The device control unit 126 controls, for example, a speaker and a microphone to output a predetermined voice message such as a warning or a message for navigation, and detects an utterance of the user in the vehicle 100 to acquire voice data. In addition, the device control unit 126 controls, for example, the display device included in the notification unit 146 to display a predetermined interface screen, or controls a navigation device to acquire setting information from the navigation device.

The communication unit 147 includes a communication device capable of communicating with the outside. The communication unit 147 is capable of wirelessly communicating with, for example, an information providing apparatus that provides map information, traffic information, weather information, and the like, and with other surrounding vehicles. The communication unit 147 has several types of communication functions, for example, a dedicated short range communication (DSRC) function and a cellular communication function.

The travel control unit 120 may include various functional blocks other than those illustrated in FIG. 1A. Further, the travel control unit 120 is capable of acquiring various types of information from any functional block other than the sensor group 144 and the camera group 145, and is also capable of acquiring information from, for example, other vehicles via the communication unit 147.

The control unit 110 is a unit for controlling the operation of the vehicle 100 in the present embodiment. The control unit 110 is capable of communicating with the travel control unit 120 and the storage unit 130 with each other.

A processor 111 integrally controls each unit of the vehicle 100 by reading and executing a program stored in a computer-readable storage medium such as a memory 112 or the storage unit 130.

A data processing unit 113 has a function of processing voice data and image data provided from the communication apparatus 200, and includes, for example, a voice data processing unit 114 and an image data processing unit 115. The voice data processing unit 114 performs voice recognition based on the voice data provided from the communication apparatus 200. The voice data is obtained by converting a voice signal generated from a user's utterance into the microphone 205 included in the communication apparatus 200 into communication data. In addition, the voice data processing unit 114 generates voice data to be notified to the user who owns the communication apparatus 200. Such voice data includes voice data in accordance with a predetermined format and voice data that has been generated based on a voice recognition result of the voice data provided from the communication apparatus 200. The image data processing unit 115 performs image recognition based on the image data that has been acquired by the camera group 145 included in the vehicle 100. Note that the data processing unit 113 may include, in addition to the voice data processing unit 114 and the image data processing unit 115, various processing units such as a processing unit that processes various types of data such as text data and a processing unit that generates data corresponding to a user interface screen to be displayed on the display unit 204 included in the communication apparatus 200.

A communication I/F 116 is an interface for achieving communication through a network 400 with other devices, which are the communication apparatus 200 and the information processing apparatus 300 in the present embodiment.

The storage unit 130 stores programs and the like for achieving the operation of the vehicle 100 in the present embodiment. The storage unit 130 stores, for example, a program for providing information provided from the communication apparatus 200 to the information processing apparatus 300 and a program for conducting interaction communication between the communication apparatus 200 (user) and the vehicle 100.

Next, a configuration of the communication apparatus 200 will be specifically described. The communication apparatus 200 is an apparatus that is portable for the user and that is associated with the user. Examples of the communication apparatus 200 include a portable terminal such as a smartphone, a tablet terminal, a wearable terminal attachable to a part of the user's body (for example, a shoulder or the like), a game machine, and the like. The communication apparatus 200 includes a processor 201, a memory 202, a communication interface (I/F) 203, a display unit 204, a microphone 205, and a speaker 206. Note that the respective functions (blocks) to be described below may be integrated together or separated from each other, and a function to be described may be implemented by another block. In addition, a function to be described as hardware may be implemented by software, and vice versa.

The operation of the communication apparatus 200 is implemented, for example, by the processor 201 executing a program stored in the memory 202. The communication I/F 203 is an interface for achieving communication through the network 400 with other devices, which are the vehicle 100 and the information processing apparatus 300 in the present embodiment. The display unit 204 includes, for example, a touch panel, displays various types of user interface screens, and accepts an operation from the user. Upon receipt of an utterance of the user who owns the communication apparatus 200, the microphone 205 generates voice data (voice signal) corresponding to the utterance. The speaker 206 outputs the voice to the user who owns the communication apparatus 200 so as to make a voice notification.

Next, a configuration of the information processing apparatus 300 will be specifically described. The information processing apparatus 300 includes a general-purpose computer, and is embodied as a server that particularly manages (controls) the vehicle 100 in the control system 1 in the present embodiment. The information processing apparatus 300 includes a processor 301, a memory 302, a communication interface (I/F) 303, and a storage unit 304. Note that the respective functions (blocks) to be described below may be integrated together or separated from each other, and a function to be described may be implemented by another block. In addition, a function to be described as hardware may be implemented by software, and vice versa.

The operation of the information processing apparatus 300 is implemented, for example, by the processor 301 reading and executing a program stored in a computer-readable storage medium such as the memory 302 or the storage unit 304. The communication I/F 303 is an interface for achieving communication through the network 400 with other devices, which are the vehicle 100 and the communication apparatus 200 in the present embodiment. The storage unit 304 stores a program and data for enabling the vehicle dispatch service, an application that is downloadable by the communication apparatus 200, and the like. Examples of the data for enabling the vehicle dispatch service include operation data indicating an operating state of the vehicle 100 to be dispatched and position data indicating the position of the vehicle 100. In addition, the storage unit 304 stores user information registered via the communication apparatus 200 associated with the user. Further, the storage unit 304 may constitute a database of map information, traffic information, weather information, and the like.

In the control system 1 configured in this manner, the vehicle dispatch service is offered (controlled) with use of the vehicle 100. An example of a flow of the vehicle dispatch service in the control system 1 will be described with reference to FIG. 2. Note that in offering the vehicle dispatch service, it is assumed that the user information that is associated with the communication apparatus 200 and that is related to the user is registered in the information processing apparatus 300 via the communication apparatus 200 (application).

In S101, the communication apparatus 200 requests a reservation for a vehicle dispatch of the vehicle 100 in response to a user's instruction (operation). Specifically, the communication apparatus 200 activates an application capable of receiving the vehicle dispatch service, and provides the information processing apparatus 300 with the user information including a predetermined ID, a password, and the like, so as to perform user login. Regarding the activation of the application, the application that has been downloaded from the information processing apparatus 300 onto the communication apparatus 200 may be activated by a click operation or the like, or the application may be activated by specifying a URL corresponding to the information processing apparatus 300. The communication apparatus 200 provides a reservation screen on the application in response to the user login that has been performed, so the user inputs reservation information for the vehicle dispatch of the vehicle 100 via the reservation screen. For example, in inputting the reservation information for the vehicle dispatch, the user designates the dispatch date and time and the dispatch place of the vehicle 100. The dispatch place of the vehicle 100 may be designated, for example, by the user designating on a map provided on the reservation screen. When the reservation information for the vehicle dispatch of the vehicle 100 is input, the communication apparatus 200 requests the reservation of the vehicle dispatch of the vehicle 100 by providing the reservation information to the information processing apparatus 300.

In S102, when the reservation information is provided from the communication apparatus 200, the information processing apparatus 300 makes a vehicle dispatch plan of the vehicle 100. In the vehicle dispatch plan of the vehicle 100, for example, it is determined whether the vehicle dispatch of the vehicle 100 is available at the dispatch date and time and the dispatch place designated in the reservation information. In a case where the vehicle dispatch of the vehicle 100 is unavailable for the dispatch date and time and the dispatch place designated in the reservation information, the information processing apparatus 300 notifies the communication apparatus 200 that the vehicle dispatch of the vehicle 100 cannot be reserved, that is, notifies of reservation unavailability of the vehicle dispatch of the vehicle 100. On the other hand, in a case where the vehicle dispatch of the vehicle 100 is available for the dispatch date and time and the dispatch place designated in the reservation information, the process proceeds to S103. Note that in the following description, it is assumed that the vehicle dispatch of the vehicle 100 is available for the dispatch date and time and the dispatch place designated in the reservation information.

In step S103, the information processing apparatus 300 notifies the communication apparatus 200 that the reservation for the vehicle dispatch of the vehicle 100 has been made, that is, notifies of a reservation decision of the vehicle dispatch of the vehicle 100. When the user confirms the reservation decision of the vehicle dispatch of the vehicle 100 via the communication apparatus 200, the user will go to the place designated in the reservation information at the dispatch date and time designated in the reservation information so as to request the vehicle dispatch of the vehicle 100.

In S104, the communication apparatus 200 requests the vehicle dispatch of the vehicle 100 in accordance with an instruction (operation) of the user. Specifically, as described above, when the instruction for the vehicle dispatch of the vehicle 100 is input from the user via the application, the communication apparatus 200 requests the vehicle dispatch of the vehicle 100 by providing the information processing apparatus 300 with such an instruction. Note that in the present embodiment, the communication apparatus (the communication apparatus that performs the process of S101) that requests the reservation of the vehicle dispatch of the vehicle 100 and the communication apparatus (the communication apparatus that performs the process of S104) that requests the vehicle dispatch of the vehicle 100 are the communication apparatus 200 (identical communication device), without being limited thereto. For example, the communication apparatus that performs the process of S101 and the communication apparatus that performs the process of S104 may be different from each other.

In S105, when the instruction for the vehicle dispatch of the vehicle 100 is provided from the communication apparatus 200 (that is, when the vehicle dispatch of the vehicle 100 is requested), the information processing apparatus 300 instructs the vehicle 100 to head for the dispatch place designated in the reservation information, based on the vehicle dispatch plan made in S102.

In S106, the vehicle 100, for which the vehicle dispatch of which has been instructed from the information processing apparatus 300, plans a route along which the vehicle 100 should travel from the current position of the vehicle 100 to the dispatch place. Note that at the time when the vehicle dispatch is instructed from the information processing apparatus 300, the vehicle 100 may be traveling on a road in accordance with a vehicle dispatch service used by another user, or may be on standby for a vehicle dispatch service. In any case, the route planning unit 124 plans an optimal route for reaching the dispatch place by the date and time designated in the reservation information, that is, by the time, based on the current position of the vehicle 100 that has been recognized by the self-position recognition unit 122 and the dispatch place designated in the reservation information provided from the information processing apparatus 300.

In S107, the vehicle 100 starts traveling for the dispatch place, as the destination, designated in the reservation information that has been provided from the information processing apparatus 300 in accordance with the route planned in S106.

In S108, when the vehicle 100 approaches the dispatch place designated in the reservation information that has been provided from the information processing apparatus 300, the vehicle 100 notifies the information processing apparatus 300 of the approach. Here, the approach to the dispatch place means reaching within a predetermined area (within a predetermined range) from the dispatch place, and means, for example, reaching within an area of 50 meters to 150 meters from the dispatch place (that is, reaching within a range of a radius 50 meters to 150 meters with the dispatch place as the center). Further, approaching a dispatch place of a vehicle may mean reaching a range in which image recognition of such a dispatch place is enabled with a certain level of accuracy or more with regard to the dispatch place.

In S109, upon receipt of the notification from the vehicle 100 that the vehicle 100 has approached the dispatch place designated in the reservation information, the information processing apparatus 300 starts interaction communication (interaction) with the user via the communication apparatus 200 in order to identify (a waiting place of) the user and to have the user get in the vehicle 100.

In S110, the interaction communication is conducted between the information processing apparatus 300 and the user, that is, the communication apparatus 200 owned by the user. In the interaction communication, the distance to the user is estimated (in detail, (the waiting place of) the user is identified). Note that, in the present embodiment, the interaction communication is conducted by voice (voice data). However, the interaction communication to be conducted by text (text data) is not excluded. However, voices are better in responsiveness than texts. Thus, it is possible to estimate the distance to the user in a short time, and it is advantageous in the time taken to identify (the waiting place of) the user and have the user get in the vehicle 100.

In S111, the information processing apparatus 300 notifies the vehicle 100 of the distance to the user (the waiting place of the user) that has been estimated via the interaction communication in S110.

In S112, the vehicle 100 travels to the place of the user based on the distance to the user that has been notified from the information processing apparatus 300, and stops at a position where the vehicle can stop, such as a space on a road shoulder.

Here, in the interaction communication (S110) between the information processing apparatus 300 and the communication apparatus 200, it is necessary to estimate (grasp) the distance to the user in a short time and in a relatively accurate manner in order to shorten the time (waiting time) taken from when the user requests the vehicle dispatch to when the user gets in the vehicle 100. However, in the interaction communication, it can be hardly expected that the user explicitly utters (identifies) the distance to the user itself for the vehicle 100 approaching the user (target place), for example, "20 meters ahead" or the like.

Figure 3:
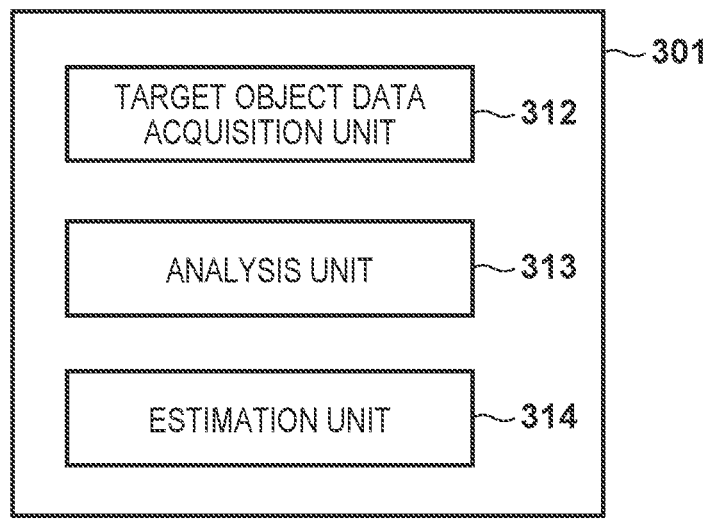
FIG. 3 is a block diagram illustrating an example of a configuration of a processor of an information processing apparatus.

Hence, in the present embodiment, there is provided a technique for analyzing a content uttered by the user in the interaction communication and estimating, as information regarding the distance to the user, the distance from the a target object selected (designated) by the user to the user in a short time and in a relatively accurate manner. In order to achieve such a technique, as illustrated in FIG. 3, the information processing apparatus 300, in detail, (a control unit including) the processor 301 includes, as functional blocks, a target object data acquisition unit 312, an analysis unit 313, and an estimation unit 314. FIG. 3 illustrates an example of a configuration of functional blocks implemented by the processor 301 of the information processing apparatus 300.

The target object data acquisition unit 312 acquires target object data including a feature of a target object for estimating the distance to the user via the communication apparatus 200. For example, in the interaction communication, the target object data acquisition unit 312 provides the communication apparatus 200 owned by the user with voice data for notifying a message like "This vehicle has come near the requested place. Please tell us a feature of a nearby landmark (target object)". When the voice data is provided from the target object data acquisition unit 312, the communication apparatus 200 outputs a message by voice via the speaker 206 like "This vehicle has come near the requested place. Please tell us a feature of a nearby landmark". Upon receipt of such a message, the user who owns the communication apparatus 200 selects a landmark present in the vicinity of the user and utters a content including the feature of the landmark present. The communication apparatus 200 collects an utterance from the user with the microphone 205, and provides voice data corresponding to such an utterance to the target object data acquisition unit 312. Accordingly, the target object data acquisition unit 312 is capable of acquiring the voice data corresponding to the utterance of the content including the feature of the landmark present in the vicinity of the user, that is, the target object selected by the user, as target object data including the feature of the target object. Note that in the present embodiment, a utility pole present on a roadside is assumed as the target object.

The analysis unit 313 analyzes whether the target object data that has been acquired by the target object data acquisition unit 312 includes at least one of data of a proper noun or data of a character string related to the target object, and whether the target object data includes data of a color related to the target object, as a feature of the target object for identifying the landmark present in the vicinity of the user, that is, the target object that has been selected by the user. For example, the analysis unit 313 analyzes the utterance of the user from the voice data acquired as the target object data by the target object data acquisition unit 312, and determines whether at least one of the data of the proper noun or the data of the character string related to the target object is included or the data of the color related to the target object is included as the feature of the target object for identifying the target place from expressions included in the utterance. Specifically, in a case where an expression "BCD is written on a signboard provided on a utility pole (target object)" is included in the utterance of the user, even in a case where the analysis unit 313 is not capable of recognizing the "proper noun" or the "character string", the analysis unit 313 estimates that the user mentions at least one of the "proper noun" or the "character string" as the feature of the utility pole from an expression "written" included in the utterance of the user, and determines that the voice data (target object data) includes at least one of the data of the proper noun or the data of the character string related to the target object as the feature of the target object. On the other hand, in a case where an expression "A signboard on a utility pole (target object) is painted in blue" is included in the utterance of the user, even in a case where the analysis unit 313 is not capable of recognizing the "blue", the analysis unit 313 estimates that the user mentions a "color" from an expression "painted", and determines that the voice data (target object data) includes the data of the color related to the target object as the feature of the target object. Note that it is generally difficult to determine (recognize) whether at least one of the data of the proper noun or the data of the character string, or data of a color is included in the voice data (target object data). However, as described above, determining whether at least one of the data of the proper noun or the data of the character string, or the data of the color is included in the voice data (target object data) from the expression included in the utterance of the user is achievable at a relatively low cost and in an easy manner, by applying an algorithm (program) known in the art.

The estimation unit 314 estimates the distance from the target object selected by the user to the user, based on an analysis result of the analysis unit 313. For example, the estimation unit 314 estimates the distance from the target object to the user such that the distance from the target object to the user in a case where the analysis unit 313 analyzes that the target object data that has been acquired by the target object data acquisition unit 312 includes at least one of the data of the proper noun or the data of the character string is shorter than the distance from the target object to the user in a case where the analysis unit 313 analyzes that the target object data that has been acquired by the target object data acquisition unit 312 includes the data of the color. Note that it can also be said that in the aforementioned estimation, the distance from the target object to the user is estimated such that the distance from the target object to the user in the case where the analysis unit 313 analyzes that the target object data that has been acquired by the target object data acquisition unit 312 includes the data of the color is longer than the distance from the target object to the user in the case where the analysis unit 313 analyzes that the target object data that has been acquired by the target object data acquisition unit 312 includes at least one of the data of the proper noun or the data of the character string.

The reason for estimating the distance from the target object to the user is that, as a result that the present inventors have earnestly studied, the present inventors have discovered a new finding that, as a feature of a target object, users more frequently mention proper nouns (a proper noun written on a signboard provided on a utility pole) and character string (a character string written on a signboard provided on a utility pole) related to the target object, as the target object becomes closer to the users, and the users more frequently mention colors (a color of the signboard provided on the utility pole) related to the target object, as the target object becomes farther from the users. According to such a finding, in a case where the target object data provided from a user via the communication apparatus 200 and including the feature of the target object selected by the user include at least one of the data of the proper noun or the data of the character string, it is considered that there is a high possibility that the user mentions the feature of the target object present at a short distance from the user. On the other hand, in a case where the target object data provided from the user via the communication apparatus 200 and including the feature of the target object selected by the user includes the data of the color, it is considered that there is a high possibility that the user mentions the feature of the target object present at a long distance from the user. Therefore, in the present embodiment, by estimating the distance the target object to the user as described above, it is possible to estimate, as the information about the distance to the user, the distance from the target object selected by the user to the user in a short time and in a relatively accurate manner.

Figure 4:
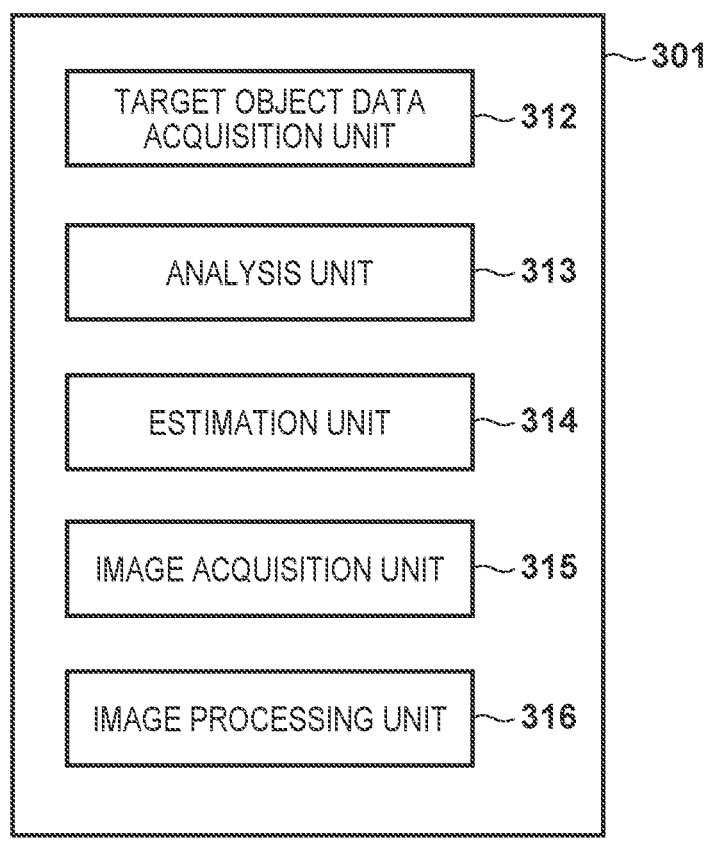
FIG. 4 is a block diagram illustrating an example of a configuration of a processor of an information processing apparatus.

The estimation unit 314 uses, for example, weighting when estimating the distance from the target object to the user such that the distance from the target object to the user in the case where the target object data includes at least one of the data of the proper noun or the data of the character string is shorter than the distance from the target object to the user in the case where the target object data that has been acquired by the target object data acquisition unit 312 includes the data of the color. In this case, as illustrated in FIG. 4, the information processing apparatus 300, in detail, the processor 301 includes, as functional blocks, an image acquisition unit 315 and an image processing unit 316, in addition to the target object data acquisition unit 312, the analysis unit 313, and the estimation unit 314.

The image acquisition unit 315 acquires image data obtained by imaging a plurality of candidate target objects to be candidates for the target object that has been selected by the user, specifically, a plurality of target objects present in the vicinity of the dispatch place designated in the reservation information, that is, in a predetermined region from the dispatch place and having different distances from each other from the dispatch place. For example, the image acquisition unit 315 acquires, from the vehicle 100, via the communication I/F 303, image data that has been obtained by an external environment recognition camera included in the camera group 145 imaging each of a plurality of target objects present in the predetermined region from the dispatch place.

The Image processing unit 316 performs image processing on the image data that has been acquired by the image acquisition unit 315, and extracts a plurality of candidate target objects included in the image data. Note that, for example, it is sufficient if template matching for extracting a target object by searching for a part most similar to an image (template) of the target object, edge detection for extracting a target object by detecting an edge (boundary) of the target object or the like is applied to the image processing for extracting a target object (candidate target object) such as a utility pole from the image data. Such an image processing can be configured at a relatively low cost and in an easy manner.

In a case where the analysis unit 313 analyzes that the target object data that has been acquired by the target object data acquisition unit 312 includes at least one of the data of the proper noun or the data of the character string, the estimation unit 314 gives higher weighting to a candidate target object closer to the user (dispatch place) among the plurality of candidate target objects that have been extracted by the image processing unit 316, and in a case where the analysis unit 313 analyzes that the target object data that has been acquired by the target object data acquisition unit 312 includes the data of the color, the estimation unit 314 gives higher weighting to a candidate target object farther from the user among the plurality of candidate target objects that have been extracted by the image processing unit 316. Accordingly, in the case where the target object data includes at least one of the data of the proper noun or the data of the character string, a candidate target object having a shorter distance from the user is considered more among the plurality of candidate target objects, and in the case where the target object data includes the data of the color, a candidate target object having a longer distance from the user is considered among the plurality of candidate target objects. As a result, the distance from the target object to the user is estimated such that the distance from the target object to the user in the case where the target object data includes at least one of the data of the proper noun or the data of the character string is shorter than the distance from the target object to the user in the case where the target object data includes the data of the color. Accordingly, it is possible to estimate the distance from the target object to the user in a short time in a relatively accurate manner.

Figure 5:
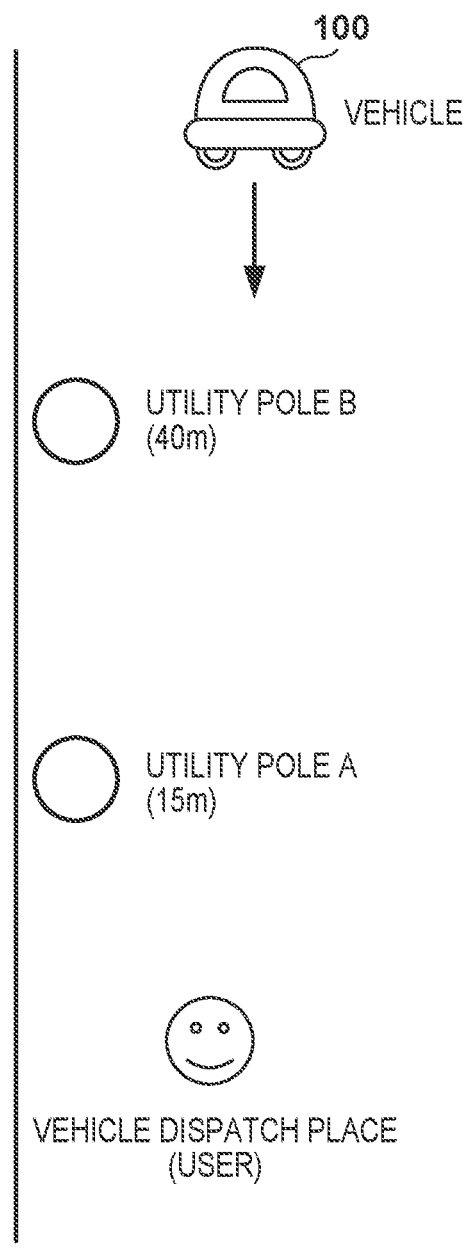
FIG. 5 is a diagram for specifically describing weighting for estimating the distance from a target object to a user.

With reference to FIG. 5, a weighting to estimate the distance from the target object to the user by the estimation unit 314 will be specifically described. Here, as illustrated in FIG. 5, it is assumed that the image processing unit 316 extracts a utility pole A having a distance of 15 meters from the dispatch place and a utility pole B having a distance of 40 meters from the dispatch place, as a plurality of candidate target objects present in a predetermined area from the dispatch place and having different distances from each other from the dispatch place. In this case, in the case where the target object data provided from the user via the communication apparatus 200 and including the feature of the target object selected by the user includes at least one of the data of the proper noun or the data of the character string, it is considered that the user mentions a feature of the utility pole A closer to the dispatch place as the target object that is the landmark. Therefore, for example, weighting "0.8" is given to the utility pole A and weighting "0.2" is given to the utility pole B. Accordingly, in estimating the distance from the target object selected by the user to the user, the distance from the utility pole A to the user is taken into consideration more than the distance from the utility pole B to the user. Therefore, it is possible to estimate the distance from the target object selected by the user to the user in a relatively accurate manner. Note that in the case where the data of the color is included in the target object data including the feature of the target object selected by the user, it is considered that the user mentions the feature of the utility pole B far from the dispatch place as the target object for identifying the target place. Therefore, for example, it is only sufficient if the weighting "0.8" is given to the utility pole B and the weighting "0.2" is given to the utility pole A.

In addition, from the viewpoint of more accurately estimating the distance from the target object selected by the user to the user, the target object is preferably the target object closest to the user (dispatch place) (for example, the utility pole A in FIG. 5, not the utility pole B). Therefore, in order to acquire the target object data including the feature of the target object closest to the user from the user in the interaction communication, the target object data acquisition unit 312 desirably provides the communication apparatus 200 owned by the user with a message for acquiring the target object data, for example, voice data notifying a message like "Please tell us a feature of a landmark closest to the requested place (target place)".

Hereinafter, a process example of the interaction communication (S110) in the information processing apparatus 300 will be described with reference to FIG. 6.

In S501, the image acquisition unit 315 acquires, from the vehicle 100 via the communication I/F 303, image data that has been acquired by the external environment recognition camera included in the camera group 145 imaging a plurality of candidate target objects that exists the inside of a predetermined area from the dispatch place.

In step S502, the image processing unit 316 performs image processing on the image data acquired in step S501 and extracts the plurality of candidate target objects included in the image data.

In step S503, the target object data acquisition unit 312 acquires, from the user via the communication apparatus 200, target object data including the feature of the target object for estimating the distance to the user. Note that a specific method for acquiring the target object data has been described above, and thus its detailed description will be omitted here.

In step S504, the analysis unit 313 analyzes the target object data acquired in step S503, and determines whether the target object data includes at least one of the data of the proper noun or the data of the character string and whether the target object data includes the data of the color. In a case where the target object data includes at least one of the data of the proper noun or the data of the character string, the process proceeds to S505, and in a case where the target object data includes the data of the color, the process proceeds to S506.

In S505, the estimation unit 314 estimates the distance from the target object selected by the user to the user, while giving weighting to each of the plurality of candidate target objects extracted in S502 so as to give higher weighting to a target object as the distance from the user (dispatch place) becomes shorter.

In S506, the estimation unit 314 estimates the distance from the target object selected by the user to the user, while giving weighting to each of the plurality of candidate target objects extracted in S502 so as to give higher weighting to a target object as the distance from the user becomes longer.

In this manner, by performing the process for the interaction communication in the information processing apparatus 300 as described above, the distance from the target object to the user is estimated such that the distance from the target object to the user in the case where the target object data includes at least one of the data of the proper noun or the data of the character string is shorter than the distance from the target object to the user in the case where the target object data includes the data of the color, or such that the distance from the target object to the user in the case where the target object data includes the data of the color is longer than the distance from the target object to the user in the case where the target object data includes at least one of the data of the proper noun or the data of the character string. Accordingly, it is possible to estimate the distance from the target object to the user in a short time in a relatively accurate manner.

In addition, in the present embodiment, the image processing unit 316 performs image processing on a plurality of pieces of candidate target object data respectively corresponding to the plurality of candidate target objects that have been extracted from the image data acquired by the image acquisition unit 315, and identifies candidate target object data including at least one of the data of the proper noun or the data of the character string related to the candidate target object, as each feature, from the plurality of pieces of candidate target object data. Note that it is sufficient if image processing capable of extracting a proper noun or a character string is applied to the image processing for identifying image data including at least one of the data of the proper noun or the data of the character string from image data (candidate target object data), even if such image processing is incapable of recognizing the proper noun itself or the character string itself. Such an image processing can be realized at a relatively low cost and in an easy manner by applying an algorithm (program) well known in the art.

Then, in the case where the analysis unit 313 analyzes that the target object data that has been acquired by the target object data acquisition unit 312 includes at least one of the data of the proper noun or the data of the character string, the estimation unit 314 estimates the distance from the target object that has been selected by the user to the user while giving weighting only to the candidate target object corresponding to the candidate target object data including at least one of the data of the proper noun or the data of the character string that has been identified by the image processing unit 316.

In this manner, in the case where the target object data includes at least one of the data of the proper noun or the data of the character string, weighting is given only to the candidate target object including at least one of the proper noun or the character string, as a feature, among the plurality of candidate target objects. It becomes possible to consider only the candidate target object including at least one of the proper noun or the character string as a feature. Therefore, it becomes possible to estimate the distance from the target object that has been selected by the user to the user in a shorter time.

In addition, in the present embodiment, a utility pole present on a roadside has been described as an example of the target object, without being limited thereto. For example, a facility present along a road may be used as a target object. In this case, for example, at least one of a proper noun or a character string written on the facility, a color of an outer wall of the facility, a type of the facility, and the like can be considered as the feature of the facility that is the target object. Therefore, in the case where the target object is the facility, the analysis unit 313 may further analyze whether the target object data that has been acquired by the target object data acquisition unit 312 includes data of the facility type related to the target object as a feature of the target object. Then, in a case where the analysis unit 313 analyzes that data of a type is included in the target object data that has been acquired by the target object data acquisition unit 312, the estimation unit 314 estimates the distance from the target object to the user such that the distance from the target object to the user in the case where the data of the type is included in the target object data is shorter than the distance from the target object to the user in the case where the data of the color is included in the target object data.

The reason for giving such an estimation is that, from the above-described new findings, in the case where the target object is the facility, it is considered that there is a high possibility that the user more frequently mentions a specific matter related to the facility such as the proper noun or the character string written on the facility or the facility type (such as a hospital, art museum, school, or the like), as the facility is closer to the user, instead of an abstract matter related to the facility such as the color of the outer wall of the facility. Therefore, by giving the estimation as described above, in the case where the data of the type is included in the target object data, the target object having a shorter distance from the dispatch place (user) is taken into consideration more. Thus, it is possible to estimate the distance from the target object to the user in a short time and in a relatively accurate manner.

Note that, in the present embodiment, the interaction communication is mainly controlled by the information processing apparatus 300, without being limited thereto. For example, a part or all of the interaction communication may be controlled by the vehicle 100, specifically, by the control unit 110 (control device) of the vehicle 100. In addition, in the present embodiment, the example of the system that provides the vehicle dispatch service for dispatching the vehicle 100 that automatically and autonomously travels to the user has been explained. A system for estimating the distance from the target object selected by the user to the user also constitutes one aspect of the present invention.

Summary of Embodiments

1. A system (for example, 1) in the above-described embodiment including:
    an acquisition unit (for example, 312) configured to acquire, from a user via a communication device (for example, 200) associated with the user, target object data including a feature of a target object selected by the user;
    an analysis unit (for example, 313) configured to analyze whether the target object data that has been acquired by the acquisition unit includes, as the feature, at least one of data of a proper noun or data of a character string related to the target object, and whether the target object data includes data of a color related to the target object; and
    an estimation unit (for example, 314) configured to estimate a distance from the target object to the user, based on an analysis result of the analysis unit,
    the estimation unit estimates the distance from the target object to the user such that the distance from the target object to the user in a case where the target object data includes at least one of the data of the proper noun or the data of the character string is shorter than the distance from the target object to the user in a case where the target object data includes the data of the color.

According to this embodiment, it is possible to estimate the distance from the target object selected by the user to the user in a short time and in a relatively accurate manner.

2. In the above-described system (for example, 1),
    the analysis unit (for example, 313) uses an algorithm for determining whether the target object data includes at least one of the data of the proper noun or the data of the character string, and whether the target object data includes the data of the color.

According to this embodiment, it is possible to configure the analysis unit (determination as to whether target object data includes at least one of data of a proper noun or data of a character string and whether the target object data includes data of a color) at a relatively low cost and in an easy manner.

3. The above-described system (for example, 1) further includes:
    an image acquisition unit (for example, 315) configured to acquire image data obtained by imaging a plurality of candidate target objects to be candidates for the target object; and
    an image processing unit (for example, 316) configured to extract the plurality of candidate target objects included in the image data that has been acquired by the image acquisition unit,
    the estimation unit (for example, 314) estimates the distance from the target object to the user while giving weighting such that in a case where the target object data includes at least one of the data of the proper noun or the data of the character string, the estimation unit gives higher weighting to a candidate target object closer to the user among the plurality of candidate target objects that have been extracted by the image processing unit, and in a case where the target object data includes the data of the color, the estimation unit gives higher weighing to a candidate target object farther from the user among the plurality of candidate target objects that have been extracted by the image processing unit.

According to this embodiment, the distance from the target object to the user is estimated such that the distance from the target object to the user in the case where the target object data includes at least one of the data of the proper noun or the data of the character string is shorter than the distance from the target object to the user in the case where the target object data includes the data of the color. It is possible to estimate the distance from the target object to the user in a short time in a relatively accurate manner.

4. In the above-described system (for example, 1),
the image processing unit (for example, 316) performs image processing on a plurality of pieces of candidate target object data respectively corresponding to the plurality of candidate target objects that have been extracted from the image data, and identifies, from the plurality of pieces of candidate target object data, candidate target object data including at least one of the data of the proper noun or the data of the character string related to the candidate target object, as the feature of each of the plurality of candidate target objects, and
in the case where the target object data includes at least one of the data of the proper noun or the data of the character string, the estimation unit (for example, 314) estimates the distance from the target object to the user, while giving the weighting such that the estimation unit gives the weighting only to a candidate target object corresponding to the candidate target object data including at least one of the data of the proper noun or the data of the character string that has been identified by the image processing unit.

According to this embodiment, it becomes possible to consider only the candidate target object including at least one of the proper noun or the character string as a feature. Accordingly, it becomes possible to estimate the distance from the target object that has been selected by the user to the user in a shorter time.

5. In the above-described system (for example, 1),
the target object is a utility pole, and
the feature of the target object includes at least one of the proper noun or the character string written on a signboard provided on the utility pole and the color of the signboard provided on the utility pole.

According to this embodiment, it is possible to use the utility pole as the target object.

6. In the above-described system (for example, 1),
the target object is a facility, and
the feature of the target object includes at least one of the proper noun or character string written on the facility, the color of an outer wall of the facility, and the type of the facility.

According to this embodiment, it is possible to use the facility as the target object.

7. In the above-described system (for example, 1),
the analysis unit (for example. 313) analyzes whether the target object data that has been acquired by the acquisition unit (for example, 312) includes data of a type related to the target object as the feature, and
the estimation unit (for example, 314) estimates the distance from the target object to the user such that the distance from the target object to the user in a case where the data of the type is included in the target object data is shorter than the distance from the target object to the user in the case where the data of the color is included in the target object data.

According to this embodiment, it is possible to estimate the distance from the target object selected by the user to the user in a short time and in a relatively accurate manner.

8. In the above-described system (for example, 1),
the target object data includes voice data generated from an utterance of the user.

According to this embodiment, it is possible to estimate the distance from the target object selected by the user to the user in a short time.

9. In the above-described system (for example, 1),
the target object includes a target object closest to the user.

According to this embodiment, it is advantageous in that it is possible to estimate the distance from the target object selected by the user to the user in a more accurate manner.

10. In the above-described system (for example, 1),
the system provides a vehicle dispatch service for dispatching a vehicle (for example, 100) that travels automatically and autonomously to a user, and
the vehicle is dispatched to the user, based on the distance from the target object to the user that has been estimated by the estimation unit (for example, 314).

According to this embodiment, it is possible to estimate the distance from the target object that has been selected by the user to the user in a short time in a relatively accurate manner. This is advantageous in the time necessary for having the user get in the vehicle.

11. The information processing apparatus (for example, 300) in the above-described embodiment including:
an acquisition unit (for example, 312) configured to acquire, from a user via a communication device (for example, 200) associated with the user, target object data including a feature of a target object selected by the user;
an analysis unit (for example, 313) configured to analyze whether the target object data that has been acquired by the acquisition unit includes, as the feature, at least one of data of a proper noun or data of a character string related to the target object, and whether the target object data includes data of a color related to the target object; and
an estimation unit (for example, 314) configured to estimate a distance from the target object to the user, based on an analysis result of the analysis unit,
the estimation unit estimates the distance from the target object to the user such that the distance from the target object to the user in a case where the target object data includes at least one of the data of the proper noun or the data of the character string is shorter than the distance from the target object to the user in a case where the target object data includes the data of the color.

According to this embodiment, it is possible to estimate the distance from the target object selected by the user to the user in a short time and in a relatively accurate manner.

12. The vehicle in the above-described embodiment is
a vehicle (for example, 100) that automatically and autonomously travels to a place of a user, the vehicle including:
an acquisition unit (for example, 110, 312) configured to acquire, from the user via a communication device associated with the user, target object data including a feature of a target object selected by the user;

an analysis unit (for example, 110, 313) configured to analyze whether the target object data that has been acquired by the acquisition unit includes, as the feature, at least one of data of a proper noun or data of a character string related to the target object, and whether the target object data includes data of a color related to the target object; and an estimation unit (for example, 110, 314) configured to estimate a distance from the target object to the user, based on an analysis result of the analysis unit, the estimation unit estimates the distance from the target object to the user such that the distance from the target object to the user in a case where the target object data includes at least one of the data of the proper noun or the data of the character string is shorter than the distance from the target object to the user in a case where the target object data includes the data of the color.

According to this embodiment, it is possible to estimate the distance from the target object selected by the user to the user in a short time and in a relatively accurate manner.

13. The control method in the above-described embodiment including:

acquiring, from a user via a communication device associated with the user, target object data including a feature of a target object selected by the user;

analyzing whether the target object data that has been acquired in the acquiring includes, as the feature, at least one of data of a proper noun or data of a character string related to the target object, and whether the target object data includes data of a color related to the target object; and estimating a distance from the target object to the user, based on an analysis result of the analyzing, the estimating estimates the distance from the target object to the user such that the distance from the target object to the user in a case where the target object data includes at least one of the data of the proper noun or the data of the character string is shorter than the distance from the target object to the user in a case where the target object data includes the data of the color.

According to this embodiment, it is possible to estimate the distance from the target object selected by the user to the user in a short time and in a relatively accurate manner.

The invention is not limited to the foregoing embodiments, and various variations/changes are possible within the spirit of the invention.

What is claimed is:

1. A system comprising:
    an acquisition unit configured to acquire, from a user via a communication device associated with the user, target object data including a feature of a target object selected by the user;
    an analysis unit configured to analyze whether the target object data that has been acquired by the acquisition unit includes, as the feature, at least one of data of a proper noun or data of a character string related to the target object, and whether the target object data includes data of a color related to the target object; and
    an estimation unit configured to estimate a distance from the target object to the user, based on an analysis result of the analysis unit,
    wherein the estimation unit estimates the distance from the target object to the user such that the distance from the target object to the user in a case where the target object data includes at least one of the data of the proper noun or the data of the character string is shorter than the distance from the target object to the user in a case where the target object data includes the data of the color.

2. The system according to claim 1, wherein the analysis unit uses an algorithm for determining whether the target object data includes at least one of the data of the proper noun or the data of the character string, and whether the target object data includes the data of the color.

3. The system according to claim 1, further comprising:
    an image acquisition unit configured to acquire image data obtained by imaging a plurality of candidate target objects to be candidates for the target object; and
    an image processing unit configured to extract the plurality of candidate target objects included in the image data that has been acquired by the image acquisition unit,
    wherein the estimation unit estimates the distance from the target object to the user while giving weighting such that in a case where the target object data includes at least one of the data of the proper noun or the data of the character string, the estimation unit gives higher weighting to a candidate target object closer to the user among the plurality of candidate target objects that have been extracted by the image processing unit, and in a case where the target object data includes the data of the color, the estimation unit gives higher weighing to a candidate target object farther from the user among the plurality of candidate target objects that have been extracted by the image processing unit.

4. The system according to claim 3, wherein the image processing unit performs image processing on a plurality of pieces of candidate target object data respectively corresponding to the plurality of candidate target objects that have been extracted from the image data, and identifies, from the plurality of pieces of candidate target object data, candidate target object data including at least one of the data of the proper noun or the data of the character string related to the candidate target object, as the feature of each of the plurality of candidate target objects, and
    in the case where the target object data includes at least one of the data of the proper noun or the data of the character string, the estimation unit estimates the distance from the target object to the user, while giving the weighting such that the estimation unit gives the weighting only to a candidate target object corresponding to the candidate target object data including at least one of the data of the proper noun or the data of the character string that has been identified by the image processing unit.

5. The system according to claim 1, wherein
    the target object is a utility pole, and
    the feature of the target object includes at least one of the proper noun or the character string written on a signboard provided on the utility pole and the color of the signboard provided on the utility pole.

6. The system according to claim 1, wherein
    the target object is a facility, and
    the feature of the target object includes at least one of the proper noun or the character string written on the facility, the color of an outer wall of the facility, and the type of the facility.

7. The system according to claim 6, wherein the analysis unit analyzes whether the target object data that has been acquired by the acquisition unit includes data of a type related to the target object as the feature, and the estimation unit estimates the distance from the target object to the user such that the distance from the target object to the user in a case where the data of the type is included in the target object data is shorter than the distance from the target object to the user in the case where the data of the color is included in the target object data.

8. The system according to claim 1, wherein the target object data includes voice data generated from an utterance of the user.

9. The system according to claim 1, wherein the target object includes a target object closest to the user.

10. The system according to claim 1, wherein the system provides a vehicle dispatch service for dispatching a vehicle that travels automatically and autonomously to a user, and
the vehicle is dispatched to the user, based on the distance from the target object to the user that has been estimated by the estimation unit.

11. An information processing apparatus comprising:
an acquisition unit configured to acquire, from a user via a communication device associated with the user, target object data including a feature of a target object selected by the user;
an analysis unit configured to analyze whether the target object data that has been acquired by the acquisition unit includes, as the feature, at least one of data of a proper noun or data of a character string related to the target object, and whether the target object data includes data of a color related to the target object; and
an estimation unit configured to estimate a distance from the target object to the user, based on an analysis result of the analysis unit,
wherein the estimation unit estimates the distance from the target object to the user such that the distance from the target object to the user in a case where the target object data includes at least one of the data of the proper noun or the data of the character string is shorter than the distance from the target object to the user in a case where the target object data includes the data of the color.

12. A vehicle that automatically and autonomously travels to a place of a user, the vehicle comprising:
an acquisition unit configured to acquire, from the user via a communication device associated with the user, target object data including a feature of a target object selected by the user;
an analysis unit configured to analyze whether the target object data that has been acquired by the acquisition unit includes, as the feature, at least one of data of a proper noun or data of a character string related to the target object, and whether the target object data includes data of a color related to the target object; and
an estimation unit configured to estimate a distance from the target object to the user, based on an analysis result of the analysis unit,
wherein the estimation unit estimates the distance from the target object to the user such that the distance from the target object to the user in a case where the target object data includes at least one of the data of the proper noun or the data of the character string is shorter than the distance from the target object to the user in a case where the target object data includes the data of the color.

13. A method comprising:
acquiring, from a user via a communication device associated with the user, target object data including a feature of a target object selected by the user;
analyzing whether the target object data that has been acquired in the acquiring includes, as the feature, at least one of data of a proper noun or data of a character string related to the target object, and whether the target object data includes data of a color related to the target object; and
estimating a distance from the target object to the user, based on an analysis result of the analyzing,
wherein the estimating estimates the distance from the target object to the user such that the distance from the target object to the user in a case where the target object data includes at least one of the data of the proper noun or the data of the character string is shorter than the distance from the target object to the user in a case where the target object data includes the data of the color.

* * * * *